United States Patent Office 3,133,916
Patented May 19, 1964

3,133,916
NEW STILBENYL-MONOAZOLE COMPOUNDS
Max Duennenberger, Birsfelden, Adolf Emil Siegrist, Basel, Erwin Maeder, Muenchenstein, and Peter Liechti, Binningen, Switzerland, assignors to Ciba Limited, Basel, Switzerland
No Drawing. Filed May 29, 1961, Ser. No. 113,149
Claims priority, application Switzerland June 2, 1960
14 Claims. (Cl. 260—240)

The present invention provides new azole compounds which, like the compound of the formula (1)
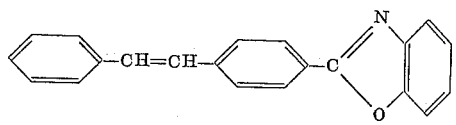

correspond to the general formula (2)
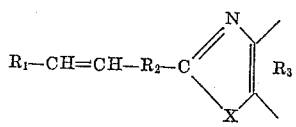

in which $R_1$ and $R_2$ each represents a benzene radical, $R_3$ represents a benzene or naphthalene radical which is condensed with the azole ring in the manner indicated by the valency lines, and X stands for its remaining member making up the azole ring.

The new azole compounds of the Formula 2 may be thiazole compounds (X=S), oxazole compounds (X=O) or imidazole compounds. The group X in the imidazole compounds is either an —NH— group or a group

in which A represent a substituent, for example a lower alkyl, alkenyl or hydroxyalkyl group with at most 4 carbon atoms or an aralkyl radical such as benzyl. The benzene or naphthalene radical $R_3$ is condensed with the azole ring in the manner indicated by the valency lines, that is to say that two carbon atoms are at the same time members of the aromatic ring and of the heterocycle.

The radicals $R_1$ and $R_3$ may contain further substituents, for example alkyl radicals such as methyl, ethyl, isopropyl, tertiary butyl, alkoxy groups such as methoxy or ethoxy, halogen atoms such as chlorine, or nitrile groups. Furthermore, they may contain a phenyl group or a cycloalkyl such as a cyclohexyl group, or acid groups imparting solubility in water such as carboxyl or sulfonic acid groups. The radical $R_2$ is preferably the phenylene radical of the formula

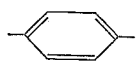

Among the new azole compounds of the Formula 2 those are especially valuable which correspond to the formula

(14)
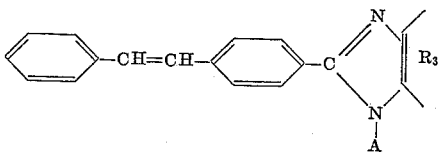

in which A represents a hydrogen atom, a benzyl radical, or a lower alkyl, alkenyl or hydroxyalkyl group with at most 4 carbon atoms, and $R_3$ stands for a benzene or naphthalene radical.

The azole compounds of the Formula 2 can be prepared by the action of a reducing agent capable of eliminating water on a compound of the formula (3)
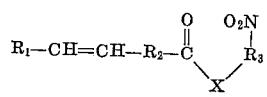

in which $R_1$ and $R_2$ have the above meanings, $R_3$ represents a benzene or naphthalene radical to which the groups $O_2N$ and —OC—X are bound in vicinal position, and X stands for an oxygen or sulfur atom or for a group

in which A represents, for example, a hydrogen atom, or a lower alkyl, alkenyl or hydroxyalkyl group containing at most 4 carbon atoms or an aralkyl group such as benzyl.

The carboxylic acid esters, carboxylic acid thioesters or carboxylic acid amines of the Formula 3 used as starting material in the process described above are obtained by reacting a carboxylic acid halide, preferably a carboxylic acid chloride of the formula (4)     $R_1$—CH=CH—$R_2$—CO—halogen where $R_1$ and $R_2$ have the above meanings, with a hydroxy-, mercapto- or aminobenzene or -naphthalene containing a nitro group in vicinal position to the substituent just mentioned. The acid halides of the Formula 4 can be prepared in the usual manner from the appropriate carboxylic acids, for example the known stilbene-4-carboxylic acid of the formula (5)
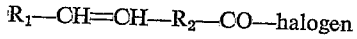

An advantageous reducing agent capable of eliminating water for use in the manufacture of the azoles from nitro compounds of the Formula 3 is a mixture of stannous chloride and hydrochloric acid. It is of advantage to perform the reaction in an inert organic solvent, for example in ethyleneglycol monomethyl ether.

Alternatively, the azole compounds of the Formula 2 can be prepared by eliminating water from a compound of the formula (6)
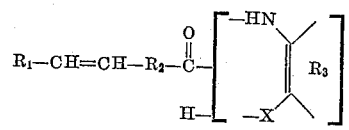

where $R_1$ and $R_2$ have the above meanings, $R_3$ represents a benzene or naphthalene radical to which —HN— and —X— are bound in vicinal position, and X represents an oxygen or a sulfur atom, a group of the formula

in which A represents, for example, a hydrogen atom or a lower alkyl, alkenyl or hydroxyalkyl group containing at most 4 carbon atoms, or an aralkyl such as benzyl radical, or, if the substituent of $R_3$ bound to hydrogen contains nitrogen, from a salt of the compound of the Formula 6, and in this manner the azole ring is closed.

In the compounds of the Formula 6 either the —HN— group may be bound to the —OC— group and the —X— group to the hydrogen atom or, vice versa, the —HN— group may be bound to the hydrogen atom and the —X— group to the —OC— group; accordingly, the following starting materials of the Formula 6 are suitable:

Carboxylic acid amides in which the radical $R_3$ is further substituted by a hydroxyl group in ortho-position (X=O), corresponding to the formula (7) 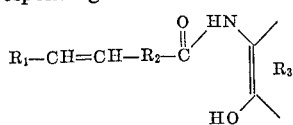

or, instead of the hydroxy compounds, the corresponding mercapto compounds (X=S);

Carboxylic acid esters in which the radical $R_3$ is further substituted by a free amino group in ortho-position (X=O), corresponding to the formula (8) 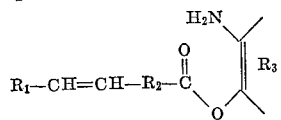

or, instead of the esters, the corresponding thioesters (X=S);

Carboxylic acid amides in which the residue $R_3$ is further substituted by a group

in ortho-position, corresponding to the formula (9) 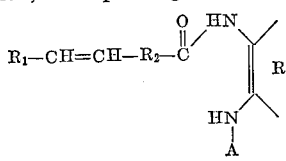

Carboxylic acid amides in which the radical $R_3$ is further substituted by a free amino group in ortho-position, corresponding to the formula

(10) 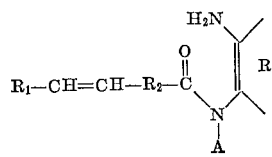

In the Formulae 7 to 10 $R_1$ to $R_3$ and A have the meanings defined above. When A represents a hydrogen atom, the Formulae 9 and 10 represent the identical carboxylic acid amides.

The compounds of the Formulae 6 and 7 to 10 can likewise be prepared by the conventional methods, for example from acid halides of the Formula 4 or from the corresponding acids and aminoaryl compounds of the formula

(11) 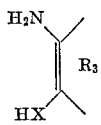

Depending on the starting materials and reaction conditions used, this procedure gives rise either to the carboxylic acid amides or to the carboxylic acid esters or thioesters respectively.

When the substituents of $R_3$ bound to the hydrogen atom contain nitrogen, that is to say when the compounds contain a basic nitrogen atom, which is the case with the compounds of the Formulae 8, 9 and 10, it is possible to use instead of the free bases salts of addition with acids, preferably the chlorides of said bases.

The elimination of water from the compounds of the Formula 6 is advantageously carried out in an inert organic solvent and at an elevated temperature, and it is useful to add an agent capable of eliminating water. As an example of a suitable agent there may be mentioned stannous chloride, and an example of an inert solvent ethyleneglycol monomethyl ether.

Furthermore, there may be mentioned as agents capable of eliminating water, zinc chloride and polyphosphoric and pyrophosphoric acids.

Finally, there may be used for the manufacture of the azole compounds of the Formula 2, instead of the acyl compounds of the Formula 6, suitable mixtures of carboxylic acids of the formula

(12)    $R_1$—CH=CH—$R_2$—COOH and aminoaryl compounds of the formula

(11) 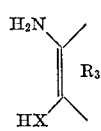

where $R_1$ to $R_3$ and X have the above meanings—the condensation and ring closure being performed without isolating the intermediates of the Formula 6.

In imidazole compounds of the Formula 2 whose imidazole rings contain a hydrogen atom attached to a nitrogen atom (A=H), it is possible to introduce at this stage, if desired, also the substituents referred to above, by treating said compounds with alkylating, alkenylating, hydroxyalkylating or aralkylating agents. Furthermore, the azole compounds may be sulfonated or—if they contain tertiary quaternizable nitrogen atoms —converted into quaternary ammonium compounds, such as imidazolium compounds.

The new azole compounds of the Formula 2 may be used, for example, as intermediates for the manufacture of dyestuffs, and with special advantage as optical brighteners for organic materials of widely differing types, for example plastic masses, resins, lacquers and fibrous materials. The new azole compounds are especially suitable for brightening synthetic fibers. Thus, the oxazole compounds, for example those of the formula

(13) 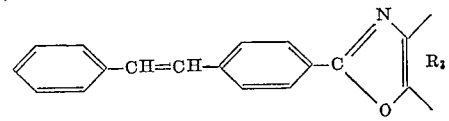

where $R_3$ has the above meaning, produce on polyester fibers, and the imidazole compounds, for example those of the formula

(14) 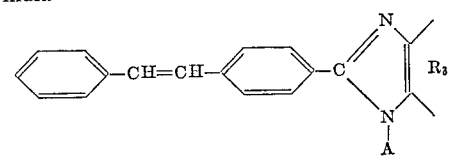

where $R_3$ and A have the above meanings, A representing, for example, a hydrogen atom, produce, more especially on polyacrylonitrile fibers, by the conventional methods especially valuable brightening effects. The brighteners can be fixed on the fibers advantageously from an aqueous bath at an elevated temperature ranging, for example, from 50 to 90° C. If desired, a dispersing agent may be added, for example when the azole compound cannot be finely and evenly dispersed without difficulty in the treatment baths.

It is also possible to incorporate the azole compounds with, or to add them to, the material to be brightened before or during its shaping. They may be incorporated with the moulding composition in the course of the manufacture of films, foils, tapes or shaped products, or dissolved or finely dispersed in the spinning solution, for example in a spinning solution of a linear synthetic polyamide before spinning.

The amount of the new azole compound to be used, calculated on the material to be optically brightened, may vary within wide limits. Even with a very small amount—in certain cases, for example with 0.01%—a distinct and permanent effect can be achieved. While in general an addition of more than about 3% does not prove harmful, it does not offer any advantage over the normal amount.

Furthermore, the new azole compounds can be used as brighteners as follows:

(a) In admixture with dyestuffs or as additives to dyebaths, printing pastes, discharge pastes or resists, also for after-treating dyeings, prints or discharge effects;

(b) In admixture with dressing agents, such as starch or synthetic dressing agents. The products of the invention may also be used in combination with liquors for imparting crease-resistance;

(c) In combination with detergents. The detergent and the brightener may be added separately to the washing liquor. It is also of advantage to use a detergent incorporating the brightener. Suitable detergents are, for example soaps, salts of sulfonate detergents such, for example, as salts of sulfonated benzimidazoles substituted on the carbon atoms 2 by higher alkyl radicals; also salts of monocarboxylic acid esters of 4-sulfophthalic acid with higher fatty alcohols; also salts of fatty alcohol sulfonates, alkylarylsulfonic acids or condensation products of higher fatty acids with aliphatic hydroxysulfonic or aminosulfonic acids. Furthermore, there may be used non-ionic detergents, for example polyglycol ethers derived from ethylene oxide and higher fatty alcohols, alkylphenols or fatty amines.

Unless otherwise indicated, parts and percentages in the following examples are by weight:

*Example 1*

A mixture of 6.5 parts of stilbene-4-carboxylic acid chloride and 3.5 parts of ortho-nitrophenol is stirred for 5 hours at 110 to 120° C. under nitrogen, then treated with 50 parts of dimethylformamide, cooled to room temperature, and the compound of the formula (15)

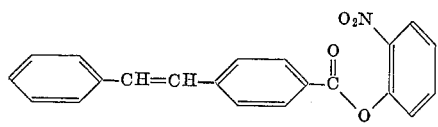

is precipitated with 100 parts of water. The product is suctioned off and rinsed with 100 parts of water, to yield about 8 parts of a yellow product melting at 230° C.

A solution of 4 parts of this compound in 100 parts of ethyleneglycol monomethyl ether is treated at 80° C. with 15 parts of stannous chloride dissolved in 28 parts of hydrochloric acid of 36% strength. The whole is stirred for 3 hours at 110° C. and the solution is then mixed with 400 parts of sodium hydroxide solution of 10% strength, whereupon the compound of the Formula 1 separates out in the form of bright-yellow crystals. Yield: about 3.5 parts.

The analytically pure product, obtained by two recrystallizations from alcohol, melts at 196.6 to 197.2° C. and reveals the following analytical values:

| $C_{21}H_{15}ON$ | C, percent | H, percent | N, percent |
| --- | --- | --- | --- |
| Calculated | 84.82 | 5.09 | 4.71 |
| Found | 84.60 | 5.03 | 4.68 |

The compound of the Formula 1 can be used as optical brightener, for example for polyester fibers.

*Example 2*

A mixture of 3.3 parts of 1-hydroxy-2-amino-4-tertiary butylbenzene, 4.9 parts of stilbene-4-carboxylic acid chloride and 50 parts of xylene is stirred for 1 hour at 100° C., then cooled to room temperature, and the yellow precipitate is suctioned off and rinsed on the filter with 50 parts of benzene. There are obtained about 7.5 parts of the compound of the formula (16)

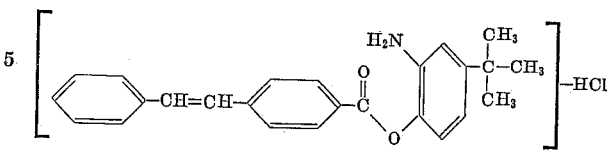

melting at 182–183° C. A solution of 5 parts of this compound in 100 parts of ethyleneglycol monomethyl ether is treated with a mixture of 30 parts of hydrochloric acid of 36% strength and 2 parts of stannous chloride, and the whole is stirred for 3 hours at 110° C. After cooling, the batch is treated with sodium hydroxide solution as described in Example 1 and the precipitate is suctioned off, to yield about 4.5 parts of the compound of the formula (17)

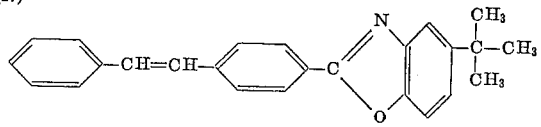

melting at 170 to 171° C. The analytically pure substance, obtained by four recrystallizations from aqueous alcohol, melts at 174.6 to 175.2° C. and reveals the following analytical data:

| $C_{25}H_{23}ON$ | C, percent | H, percent | N, percent |
| --- | --- | --- | --- |
| Calculated | 84.95 | 6.56 | 3.95 |
| Found | 84.68 | 6.42 | 4.14 |

The compound of the Formula 17 may be used as optical brightener for polyolefines, for example polyethylene, or for polyvinyl chloride.

*Example 3*

A mixture of 6.05 parts of stilbene-4-carboxylic acid chloride and 3.4 parts of ortho-nitraniline is stirred for 2 hours at 140° C., then treated with 50 parts of dimethylformamide and cooled to room temperature; the compound of the formula (18)

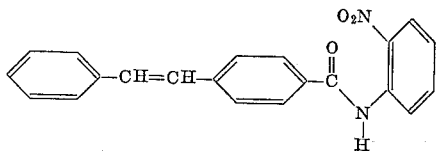

is precipitated with 100 parts of water, suctioned off and rinsed with 50 parts of water, to yield about 8.5 parts of yellow crystals melting at 167 to 168° C.

4 parts of the compound of the Formula 18 are dissolved in 150 parts of ethyleneglycol monomethyl ether and treated at 80° C. with a solution of 11 parts of stannous chloride in 20 parts of hydrochloric acid of 36% strength. The whole is stirred for 3 hours at 110° C., and the solution is then mixed with 400 parts of sodium hydroxide solution of 10% strength, whereupon the compound of the formula (19)

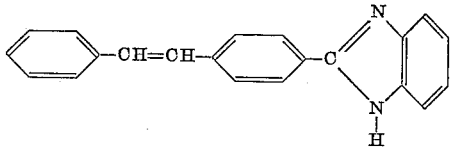

is obtained in the form of pale yellowish crystals. Yield: about 3.3 parts.

Four recrystallizations from aqueous alcohol yield the analytically pure compound which melts at 267.5 to 268.5° C. and reveals the following analytical data:

| $C_{21}H_{16}N_2$ | C, percent | H, percent | N, percent |
|---|---|---|---|
| Calculated | 85.11 | 5.44 | 9.34 |
| Found | 84.81 | 5.41 | 9.38 |

*Example 4*

When the reaction described in Example 2 is performed with 2.7 parts of 1-hydroxy-2-amino-4:5-dimethylbenzene instead of with 1-hydroxy-2-amino-4-tertiary butylbenzene, the compound of the formula

(20) 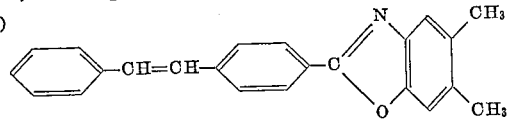

is obtained in equal purity and yield. After having been recrystallized four times from aqueous dimethylformamide, the product melts at 229.6 to 230.2° C. and reveals the following analytical data:

| $C_{23}H_{19}ON$ | C, percent | H, percent | N, percent |
|---|---|---|---|
| Calculated | 84.89 | 5.89 | 4.30 |
| Found | 84.90 | 5.90 | 4.37 |

*Example 5*

When the reaction of Example 2 is performed with 2.6 parts of 1-hydroxy-2-amino-4-methylbenzene instead of with 1-hydroxy-2-amino-4-tertiary butylbenzene, the compound of the formula

(21) 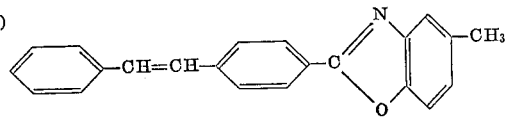

is obtained in equal purity and yield. After having been recrystallized twice from aqueous ethanol, the product melts at 179.6 to 180.2° C. and reveals the following analytical data:

| $C_{22}H_{17}ON$ | C, percent | H, percent | N, percent |
|---|---|---|---|
| Calculated | 84.86 | 5.50 | 4.50 |
| Found | 84.85 | 5.63 | 4.64 |

*Example 6*

A mixture of 6.1 parts of 4-methyl-1:2-diaminobenzene, 11.2 parts of stilbene-4-carboxylic acid and 0.2 part of boric acid is stirred for 1½ hours at 220–225° C. under nitrogen. The melt is then dissolved in 30 parts of dimethylformamide and precipitated with 70 parts of 2 N-sulfuric acid. The yellow reaction product is suctioned off and rinsed with 50 parts of 2 N-sulfuric acid and then with 100 parts of water. The filter cake is then stirred for 1½ hours at room temperature with 150 parts by volume of ammonia solution of 10% strength, suctioned off and washed until the washings run neutral. In this manner there are obtained about 13 parts of the compound of the formula

(22) 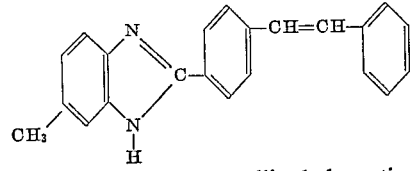

which after having been recrystallized three times from aqueous ethanol, melts at 236–236.5° C. and reveals the following analytical data:

| $C_{22}H_{18}N_2$ | C, percent | H, percent | N, percent |
|---|---|---|---|
| Calculated | 85.13 | 5.85 | 9.18 |
| Found | 85.12 | 5.90 | 9.03 |

*Example 7*

A mixture of 15.8 parts of 1:2-diaminonaphthalene, 22.4 parts of stilbene-4-carboxylic acid, 80 parts of glycerol and 0.5 part of boric acid is stirred for 1 hour at 100 to 110° C. under nitrogen. The temperature is raised within 1 hour to 200–210° C. and so maintained for another 5 hours. The batch is then cooled to 100° C. and the mixture is treated with 200 parts of water, whereupon the compound of the formula

(23) 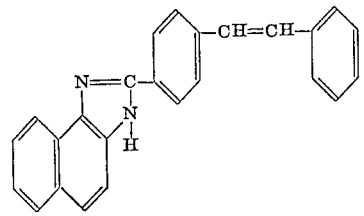

is precipitated in the form of yellow crystals. After having been recrystallized four times from aqueous alcohol, the product melts at 220° C. and reveals the following analytical data:

| $C_{21}H_{18}ON$ | C, percent | H, percent | N, percent |
|---|---|---|---|
| Calculated | 86.67 | 5.24 | 8.09 |
| Found | 86.56 | 5.08 | 8.03 |

The compound of the Formula 23 can be used for optically brightening, for example, polyacrylonitrile fibers.

The following compounds were prepared by the processes described in Examples 6 and 7:

| | C calc. | C found | H calc. | H found | N calc. | N found |
|---|---|---|---|---|---|---|
| (24) $CH_3O-\phantom{xx}$—CH=CH—$\phantom{xx}$ structure M.P. 274–276° C. | 80.95 | 80.29 | 5.56 | 5.70 | 8.58 | 8.50 |

| | C calc. | C found | H calc. | H found | N calc. | N found |
|---|---|---|---|---|---|---|
| (25) 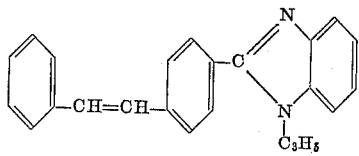<br>M.P. 112–113° C. | 85.45 | 85.75 | 6.64 | 6.73 | 3.69 | 3.95 |
| (26) ![structure]<br>M.P. 236–236.5° C. | 86.43 | 86.86 | 4.93 | 5.02 | 4.03 | 3.86 |
| (27) 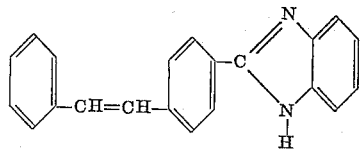<br>M.P. 229.5–230° C. | 80.48 | 80.36 | 4.82 | 4.77 | 4.47 | 4.44 |

Example 8

15 parts of stilbenylbenzimidazole of the Formula 19 are dissolved in a solution of 1 part of sodium hydroxide in 150 parts of absolute alcohol, and the whole is treated at 75° C. in the course of ½ hour with 10 parts of allylbromide, stirred for 1 hour, and the solution is then treated with 500 parts of water, whereupon the product of the formula (28)

separates out in the form of yellowish needles. Yield: about 17 parts. Melting point: above 330° C.

The new compound may be used as an optical brightener for polyacrylonitrile fibers.

When in this example allylbromide is replaced by a corresponding amount of benzylchloride, ethylenechlorohydrin, glycerol chlorohydrin or dimethyl sulfate, the corresponding benzimidazoles substituted on the nitrogen atom are obtained which likewise brighten up polyacrylonitrile fibers.

Example 9

A mixture of 15 parts of the compound of the formula (19)

22 parts of para-toluenesulfonic acid ethyl ester and 50 parts of ethyleneglycol is stirred for 1 hour at 150° C., then cooled to room temperature (about 18° C.) and treated with 80 parts of alcohol, and the product of the formula

(29) 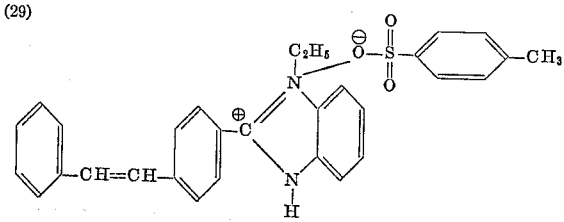

is suctioned off. Yield: about 25 parts. Melting point: 273–274° C.

| $C_{30}H_{28}O_3N_2S$ | C, percent | H, percent |
|---|---|---|
| Calculated | 72.53 | 5.68 |
| Found | 72.40 | 5.44 |

Example 10

100 parts of a fabric from polyester fibers from terephthalic acid and ethyleneglycol, for example "Terylene," are treated for 1 hour at 60 to 90° C. in a bath of the following composition:

3000 parts of water,
6 parts of formic acid of 85% strength,
0.7 part of the oxazole compound of the Formula 1, described in Example 1, then rinsed and dried.

The material so treated has a higher white content than material treated in a similar manner but without addition of the oxazole compound.

Example 11

50 parts of a polyacrylonitrile fiber fabric are treated in a bath of the following composition:

1500 parts of water,
2 parts of formic acid of 85% strength,
0.01 part of the imidazole compound of the Formula 19, obtained as described in Example 3, for 30 minutes at 85 to 95° C., then rinsed and dried.

The material so treated is whiter than material treated in the absence of the imidazole compound.

Instead of the imidazole compound of the Formula 19 there may be used the imidazole compound of the Formula 23 or of the Formula 28, the brightening effect so achieved being substantially identical.

A brightening effect is also obtained on yarns made from thermostable polyvinylchloride fibers.

*Example 12*

Cotton, acetate rayon or polyamide fibers are washed in the goods-to-liquor ratio of 1:30 for ½ hour at 50° C. in a solution of 5 parts of soap per liter of water, the soap containing 0.1% of the compound of the formula

(23) 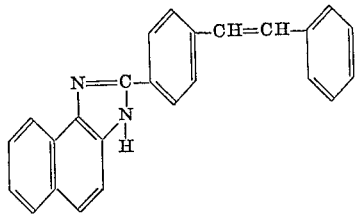

The material is then rinsed and dried.

Materials treated in this manner are whiter than materials treated in the absence of the imidazole compound.

*Example 13*

100 parts of polyethylene are rolled on a warm calender until a homogeneous foil has formed. 0.08 part of the azole compound of the Formula 17 and 0.5 part of titanium dioxide are then incorporated with the foil. The foil is pulled off the calendar and pressed between steel platens heated at 130 to 135° C. to give it a smooth surface on both sides.

The opaque polyethylene foil manufactured in this manner has a substantially higher white content than a foil not containing the azole compound.

*Example 14*

A paste is prepared from 100 parts of polyvinylchloride, 3 parts of a stabilizer, 2 parts of titanium dioxide, 59 parts by volume of dioctylphthalate and 0.08 part of the azole compound of the Formula 17 or of the azole compound of the Formula 27 and rolled on a calender at 150 to 155° C. until it forms a foil.

The opaque polyvinylchloride foil produced in this manner has a considerably higher white content than a foil not containing the azole compound.

What is claimed is:

1. A compound of the formula

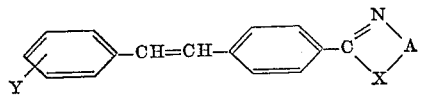

wherein X is selected from the group consisting of

—O—, —S—, —NH—, —N—
                      |
                      lower alkyl

—N—          , —N—
|                |
lower alkenyl   hydroxy lower alkyl and

—N—
|
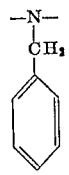
CH₃

Y is selected from the group consisting of hydrogen and lower alkoxy and A is selected from the group consisting of

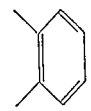

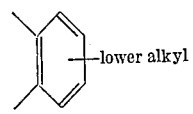

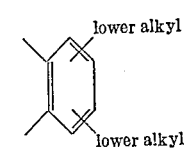

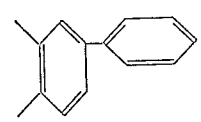

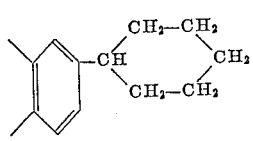

and

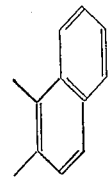

2. The oxazole compound of the formula

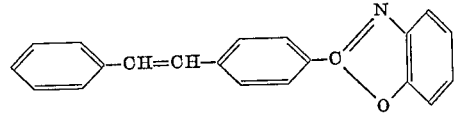

3. The oxazole compound of the formula

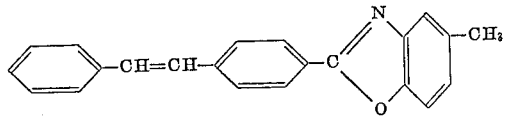

4. The oxazole compound of the formula

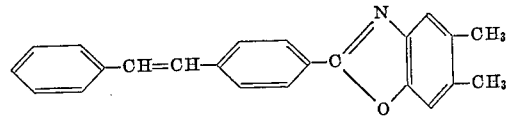

5. The oxazole compound of the formula

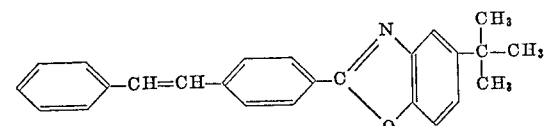

6. The oxazole compound of the formula

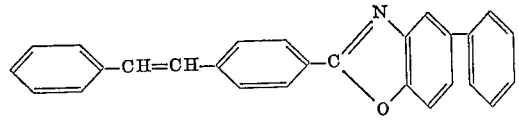

7. The oxazole compound of the formula

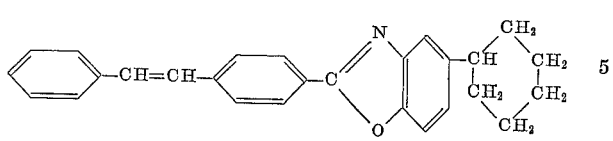

8. The thiazole compound of the formula

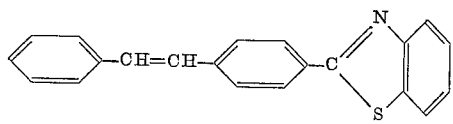

9. The imidazole compound of the formula

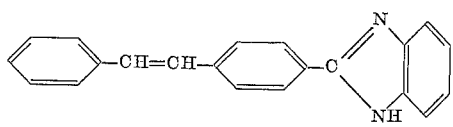

10. The imidazole compound of the formula

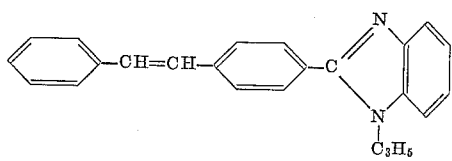

11. The imidazole compound of the formula

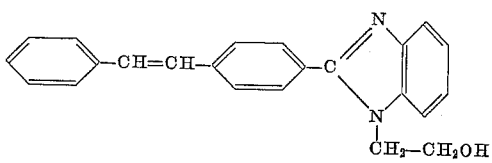

12. The imidazole compound of the formula

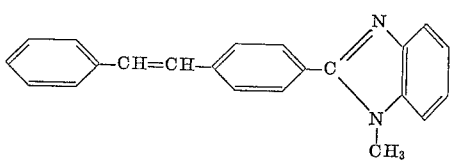

13. The imidazole compound of the formula

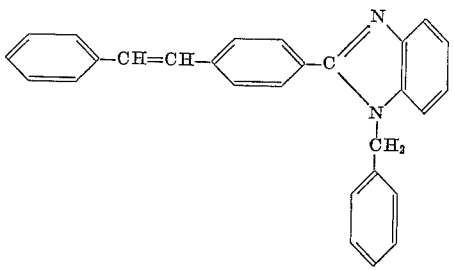

14. The imidazole compound of the formula

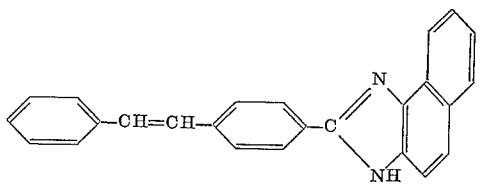

References Cited in the file of this patent
UNITED STATES PATENTS 2,838,504    Crounse _____ June 10, 1958

OTHER REFERENCES

Skraup et al.: Ber. d. Deut. Chem. Ges., vol. 59, pages 1007–15 (1926).

Beilstein's Handbuch der Organischen Chemic, 4th ed., vol. 23, EII, pages 281 and 475, Springer-Verlag, Berlin (1954).

Beilstein's Handbuch der Organischen Chemie, vol. 27, EII, pages 56 and 998, Springer-Verlag, Berlin (1955).

Chemical Abstracts, vol. 53, pages 1 and 360–1(s), December 25, 1959.